(12) United States Patent
Divisi (10) Patent No.: US 8,881,871 B2
(45) Date of Patent: Nov. 11, 2014

(54) MINIMAL LUBRICATION DEVICE

(75) Inventor: Walter Divisi, Monaco (IT)

(73) Assignee: Dropsa S.p.A., Milan (IT)

( * ) Notice: Subject to any disclaimer, the term of this patent is extended or adjusted under 35 U.S.C. 154(b) by 363 days.

(21) Appl. No.: 13/194,933

(22) Filed: Jul. 30, 2011

(65) Prior Publication Data
US 2012/0031705 A1 Feb. 9, 2012

(30) Foreign Application Priority Data
Aug. 6, 2010 (IT) .............................. MI2010A1516

(51) Int. Cl.
*F01M 9/00* (2006.01)
*F16N 7/32* (2006.01)
*F16N 27/00* (2006.01)

(52) U.S. Cl.
CPC ................ *F16N 27/005* (2013.01); *F16N 7/32* (2013.01)
USPC ...................................................... 184/55.1

(58) Field of Classification Search
CPC ............. F16N 7/32; F16N 7/34; F01D 25/18; B23Q 11/10
USPC ................................................... 184/55.1, 39
See application file for complete search history.

(56) References Cited

U.S. PATENT DOCUMENTS

| | | | | |
|---|---|---|---|---|
| 2,830,767 A | * | 4/1958 | Herbenar | 236/99 R |
| 3,587,782 A | * | 6/1971 | Russell | 184/7.4 |
| 3,626,977 A | * | 12/1971 | Riley et al. | 137/516.25 |
| 3,706,355 A | * | 12/1972 | Oglesbee | 184/6 |
| 4,245,465 A | * | 1/1981 | Milo | 60/39.08 |
| 5,427,203 A | | 6/1995 | Anspach, Jr. et al. | |
| 5,598,974 A | | 2/1997 | Lewis et al. | |
| 6,065,689 A | | 5/2000 | Kizer et al. | |
| 6,263,913 B1 | * | 7/2001 | Kussel | 137/551 |
| 2004/0238772 A1 | * | 12/2004 | Bachman et al. | 251/126 |

FOREIGN PATENT DOCUMENTS

| | | |
|---|---|---|
| DE | 2701580 A1 | 7/1978 |
| DE | 4113388 A1 | 10/1992 |
| DE | 29512697 U1 | 12/1995 |
| EP | 0351579 A2 | 1/1990 |
| EP | 1600839 A2 | 11/2005 |

OTHER PUBLICATIONS

Search Report dated Mar. 15, 2011 from priority Italian Appl No. MI2010A 001517 (corresponding to U.S. Appl. No. 13/194,927).
U.S. Appl. No. 13/194,927—"Minimal Lubrication Device with Fine Regulation of the Oil flow" filed Jul. 30, 2011.

(Continued)

*Primary Examiner* — William A Rivera
*Assistant Examiner* — Michael Riegelman
(74) *Attorney, Agent, or Firm* — Novak Druce Connolly Bove + Quigg LLP (57) ABSTRACT

A minimal lubrication device including a lubricant fluid storage reservoir and a pump for the lubricant, the pump being a high pressure pump with a delivery side connected to at least one modular element arranged to mix a compressed air flow with the lubricant, the modular element presenting a mixer element fed with a compressed air flow into which an outlet opens of a needle flow regulator fed by the lubricant originating from the pump. The module includes a compensator device which maintains the oil quantity dispensed by the flow regulator constant even if the pressure on the user side changes.

17 Claims, 5 Drawing Sheets

(56) References Cited

OTHER PUBLICATIONS

Search Report dated Mar. 3, 2011 from priority Italian Application No. MI2010A 001516.

Jun. 21, 2013, Office Action for U.S. Appl. No. 13/194,927, Walter Divisi et al. filed Jul. 30, 2011.
Mar. 17, 2014, Notice of Allowance for U.S. Appl. No. 13/194,927, Walter Divisi et al. filed Jul. 30, 2011.

\* cited by examiner

MINIMAL LUBRICATION DEVICE

CROSS-REFERENCE TO RELATED APPLICATIONS

This application claims priority under 35 USC 119 from Italian Application No. N. MI2010A 001516, filed on Aug. 6, 2010.

The present invention relates to a minimal air/oil lubrication device.

More particularly, it relates to a modular device.

Air/oil lubrication represents a relatively recent reality, and is the result of the introduction of advanced technologies which have enabled it to be applied mainly in the field of dry machining. It has also replaced traditional spray systems because of their negative environmental impact.

Essentially, the lubrication takes place by feeding a continuous air flow to which provides not only a transport means for the oil as far as the lubrication point, but also a cooling means for those members to be lubricated and for the lubrication system.

The oil, injected into the air flow at regular intervals, covers the surfaces to be lubricated, so reducing friction and wear.

Certain air/oil lubrication devices currently comprise an oil reservoir which is pressurized by a compressed air source. The oil pressurized in this manner is fed to a needle valve having an exit coupled to a conduit through which compressed air flows.

The lubricant flow leaving the valve is hence transported by the compressed air and led towards the lubrication region. This system presents the drawback of being sensitive to the pressure present at the lubrication point on the user side. In this respect, the greater the pressure at that point the greater is the pressure of the transport air present in the conduit into which the oil is delivered, with a consequently lesser oil quantity injected into the flow. As is known, the oil quantity flowing through an orifice (needle valve) depends on the pressure difference between the conduit into which said oil is delivered and the initial fluid pressure (pressure in the oil reservoir). Consequently such a device type cannot be used if a user is present in which the pressure at the delivery point undergoes considerable variation.

It also has the drawback of using a pressurized oil reservoir. This means that the system has to be halted, so depressurizing the reservoir, each time that the lubricant has to be topped up.

An object of the present invention is to provide an air/oil lubrication device which represents an improvement over the known art, while at the same time being less costly and of higher performance.

A particular object of the present invention is to provide a device which enables more precise regulation of the oil dispensed by the needle valve, independently of the pressure present on the user side.

These and other objects are attained by an air/oil lubrication device in accordance with the teachings of the accompanying claims.

Further characteristics and advantages of the invention will be more apparent from the description of a preferred but non-exclusive embodiment of the air/oil lubrication device, illustrated by way of non-limiting example in the accompanying drawings, in which.

With reference to said figures, these show schematically an air/oil lubrication device indicated overall by the reference numeral 1.

It comprises a lubricant fluid storage reservoir 2. The reservoir comprises a conduit connecting an outlet of the reservoir to a suction port of a high pressure pump 6.

The conduit feeds lubricant fluid from the reservoir 2 to a suction port 7.

The pump can be of any known type and comprises a high pressure delivery port, able to pump the oil or lubricant contained in the reservoir to a pressure between 1 bar and 10 bar.

In an alternative embodiment, the lubricant contained in the reservoir can be pressurized by suitable means different from the pump (for example pneumatic) to feed the pressurized lubricant to a delivery conduit.

The delivery conduit feeds one or more air/oil mixer modules M.

Each modular element M presents a first passage 73 for pressurized oil entry and a second passage 72 for compressed air entry. The compressed air originates from a compressor C or from a works compressed air line, for example at a pressure of 50 bar.

Advantageously when several modular elements are arranged one above another, the passages 72 and 73 (FIG. 2) of each modular element define a pressurized oil conduit 81 and a compressed air conduit 80 connected respectively to the delivery conduit and to a compressed air source or feed C.

Each modular element M draws from these conduits the compressed air and the pressurized oil required for its operation.

Figure 2:
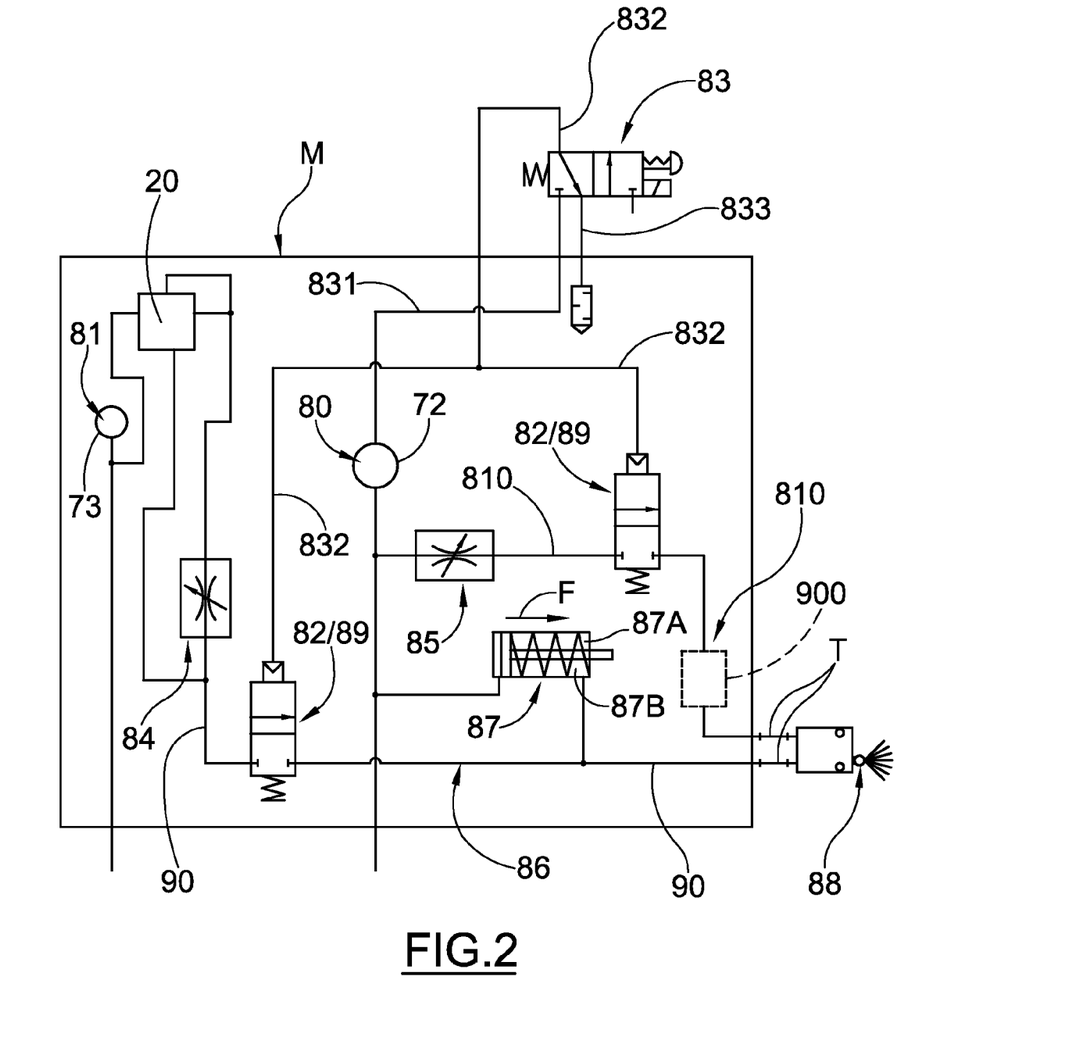
FIG. 2 is a scheme of a modular mixer element forming part of the lubrication device of the present invention.

The scheme of each modular element 50 is shown in FIG. 2. From this it can be seen that the lubricant delivered by the pump 6 passes through the conduit 81 to the needle flow regulator 84 which varies the inlet oil quantity. The flow regulator 84 presents a needle valving element on which a graduated scale is fixed together with an operating knob. The exit line 84 from the flow regulator 84 opens towards a mixer element 88. It is intercepted by an intercepting element which in the example is a piloted piston 82 coupled to a spring valve 89 controlled by a solenoid valve 83.

The conduit 90 also presents a branch which connects it to an anti-drip piston 87 further connected to the compressed air feed.

When air is present in the conduit 80, it is in the position shown by the arrow F (opposite to that illustrated, with the spring 87A compressed).

When the conduit 80 is without pressure the spring 87A elongates and the piston moves into the illustrated position, drawing the lubricant present in the conduit 90 into a chamber 87B.

The conduit 80 communicates via the passage 72 with an air flow regulator cock 85, the exit of which opens via a conduit 810 into the modular element 88. The cock 85 also presents a needle valving element 85A with a head 85B enabling it to be controlled.

As in the preceding case the conduit 810 is intercepted by a further pilot piston 82 with a spring valve 89, and also controlled by the solenoid valve 83.

The solenoid valve 83 (optional) presents an inlet conduit 831 communicating with the compressed air conduit 80. It is able to connect a control conduit 832 for the pilot pistons 82 to a discharge 833 (pistons 2 open and lines 86 and 810 operative), or to the inlet 831 (pistons 2 closed and lines 86 and 810 inoperative).

The mixing element 88 is substantially a nozzle which can be provided directly on each module M (FIG. 6) or can be connected to the respective module by suitable air and lubricant pipes T which bring it directly into proximity with the point at which lubrication is required. In the first case a single air/oil pipe is sufficient extending from the module directly to the use position.

If the solenoid valve 83 is absent, the holes provided in each modular element M deriving from the conduits 831, 832 and 833 are closed by a plate. In that case the pilot pistons 82 are always in a position such as to enable fluid to pass into the conduits 90 and 810.

The air cock 85 could also not be provided. Each module can then be fed by a different air source, as the conduit 80 is therefore absent.

In a preferred embodiment, a conventional vortex tube 900 is provided on the conduit 810 of each module to regulate the temperature of the air fed to the nozzle 88. In this manner, the temperature of the air fed to the nozzle 88 can be adjusted by means of a suitable adjustment screw. This enables a valid cooling effect to be obtained in addition to lubrication.

Figure 1:
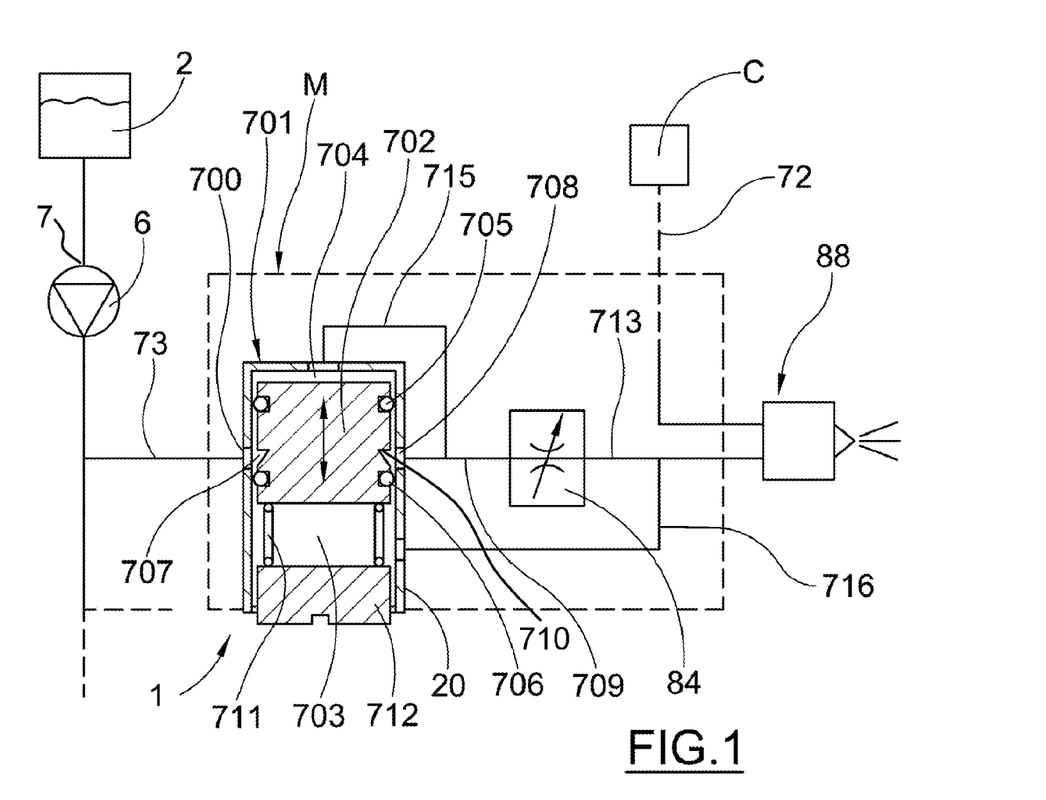
FIG. 1 is a schematic view of a lubrication device of the present invention, with some parts shown sectioned.

According to the present invention each module presents a compensator device 20 visible in FIG. 1, which represents a simplified module shown schematically to simplify the understanding of the compensator device 20. The compensator device 20 comprises a seat 701 in which a slider 702 defining a second chamber 703 and a first chamber 704 is movable against a spring. The slider comprises a pair of gaskets 705, 706 which further define an annular chamber 707 centrally surrounding the slider.

The annular chamber 707 presents an entry port communicating with the pressurized conduit leaving the pump 6 and an exit port 708 opening into a conduit 709 which feeds the needle flow regulator 84.

On its lateral surface the slider comprises an undercut 710 facing the entry port or/and the exit port. In the illustrated embodiment, for convenience it is shown extending along the entire perimeter of the slider. The slider is loaded by a spring 711 provided in the first chamber 704, this spring resting on a preloaded screw 713.

The second chamber 703 is in fluid passage communication with an outlet conduit 713 from the needle regulator 84, which feeds oil to the air/oil mixer 88.

The operation of the invention is substantially as follows.

The pump is activated to supply oil to the mixer 88, to which compressed air is fed at the same time. The pressure present in the conduit 713 (and hence immediately downstream of the needle regulator) depends on the user pressure.

In an initial stage the nozzle is made to spray into the atmosphere (gauge pressure zero on the user side).

The pressurized oil enters the annular chamber 707 of the compensator device and is directed towards the needle valve 84. A portion of the pressurized oil is withdrawn by the conduit 715 and fed to the first chamber 704. A part of the oil leaving the needle regulator is fed to the second chamber 703 by a further conduit 716. Consequently the pressure in the first chamber 704 is equal to the pressure at the inlet of the needle valve, whereas the pressure in the second chamber 703 is equal to the pressure leaving the needle valve.

Under these conditions, the slider 702 is subjected to the pressure present in the first chamber 704 (pressure regulated on the basis of the position of that section of the port 700 left uncovered by the undercut 710) and to the pressure present in the second chamber 703 (pressure deriving from the spring plus the pressure present at the outlet of the regulator 84—pressure on user side), the slider consequently moving into an equilibrium position.

Under these conditions the pressure difference between the conduit 713 and the conduit 709 (needle valve inlet and outlet) is equal to a well defined value (for example 3 bar) which corresponds to a determined oil quantity flowing through the conduit 713.

Under these conditions suitable adjustments are made to the needle valve and the adjustment screw to obtain the desired oil quantity per time unit.

Once this value has been set, the module M is regulated and the mixer 88 can be set in its working position (and hence subjected to working pressure on the tool side).

In this case the pressure present in the conduit 713 rises to a value equal to the pressure on the user side. The rise in this pressure causes a corresponding increase in the pressure in the second chamber, resulting in an upward movement of the piston with consequent increase in the oil cross-section imposed by the port 707 partly obscured by the slider 702.

The slider movement terminates when the pressure in the first chamber equals that in the second. This leads to an increase in the inlet pressure to the needle regulator 84, consequent on an increase in the pressure of its exit (user side).

The needle regulator hence "sees" a difference between the outlet and inlet pressure identical to the rest situation, and hence dispenses an oil quantity substantially equal to that set when the mixer 88 was not subjected to working pressure.

If the pressure on the user side decreases, the slider 702 is lowered to find a new equilibrium point. Again in this case the needle regulator is subjected to the same pressure difference, hence resulting in the same oil quantity dispensed.

A system has thus been found which is able to dispense a substantially constant oil quantity, even if very variable user pressures are present.

Figure 3:
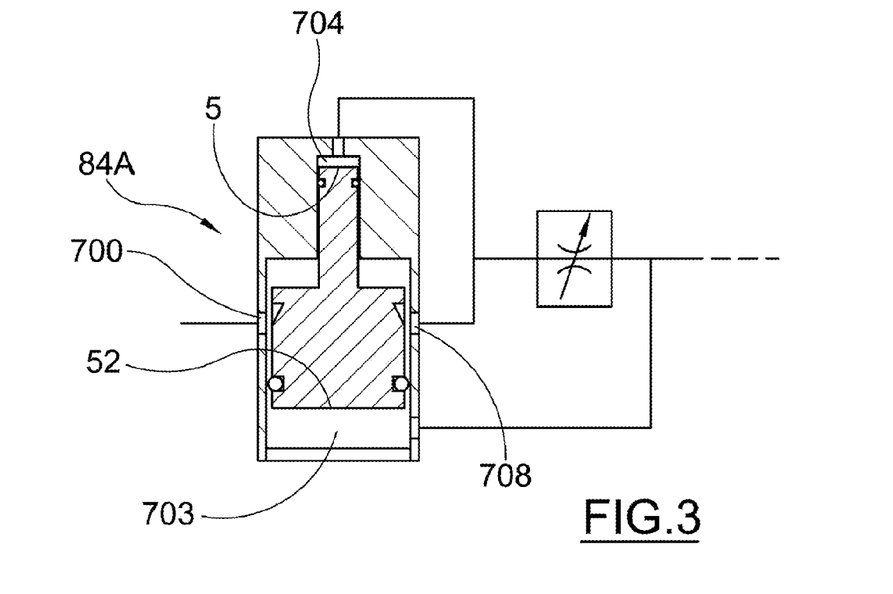
FIG. 3 shows an alternative embodiment of the present invention.

A different embodiment of the compensator device is shown in FIG. 3. Here, instead of the spring 711 which increases the thrust which the oil present in the second chamber exerts on the slider, there is a difference in the piston areas on which the pressure present in the first and second chamber acts.

Figure 4:
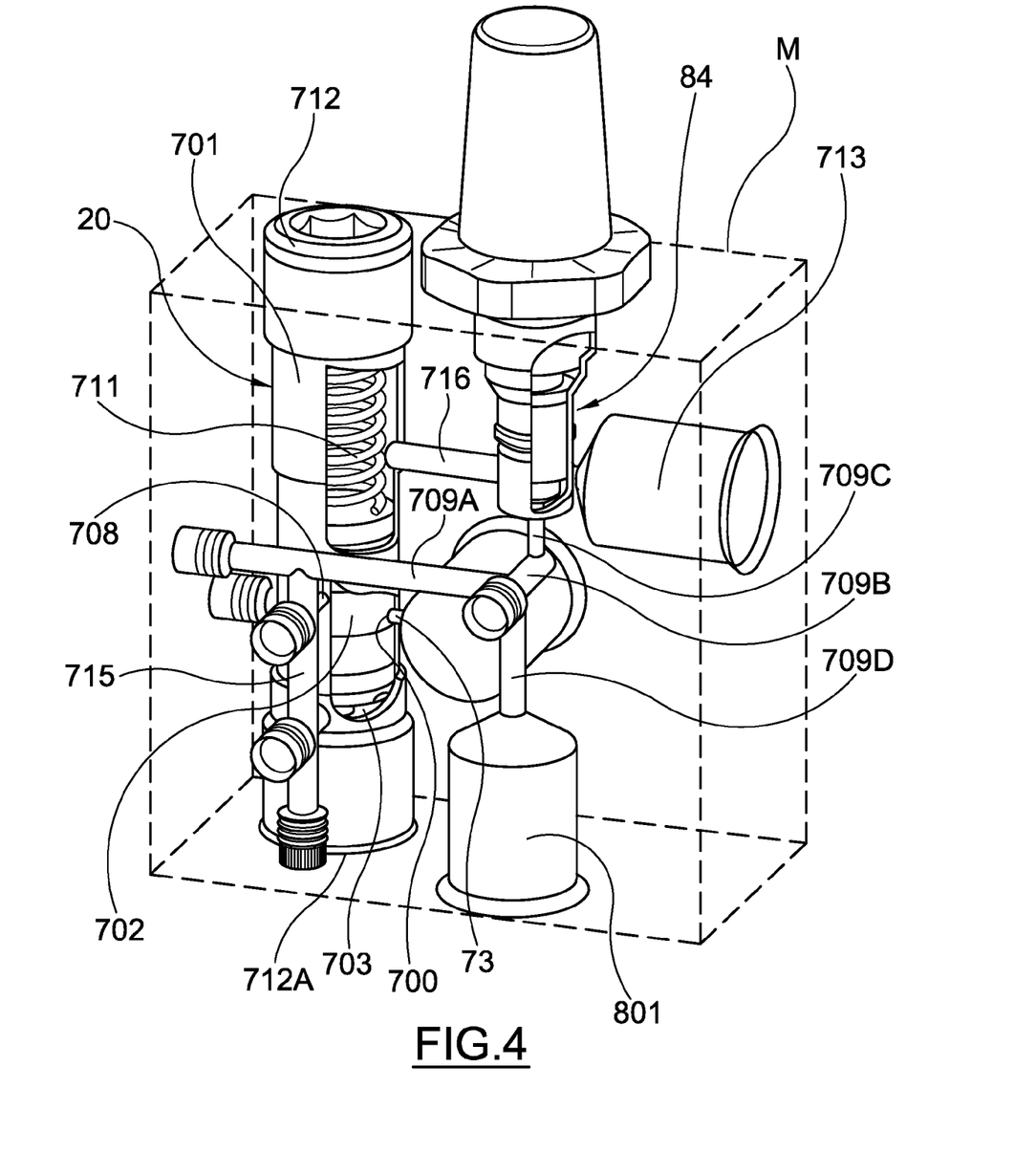
FIG. 4 is a partly sectional simplified perspective view of a different embodiment of the invention.
Figure 5:
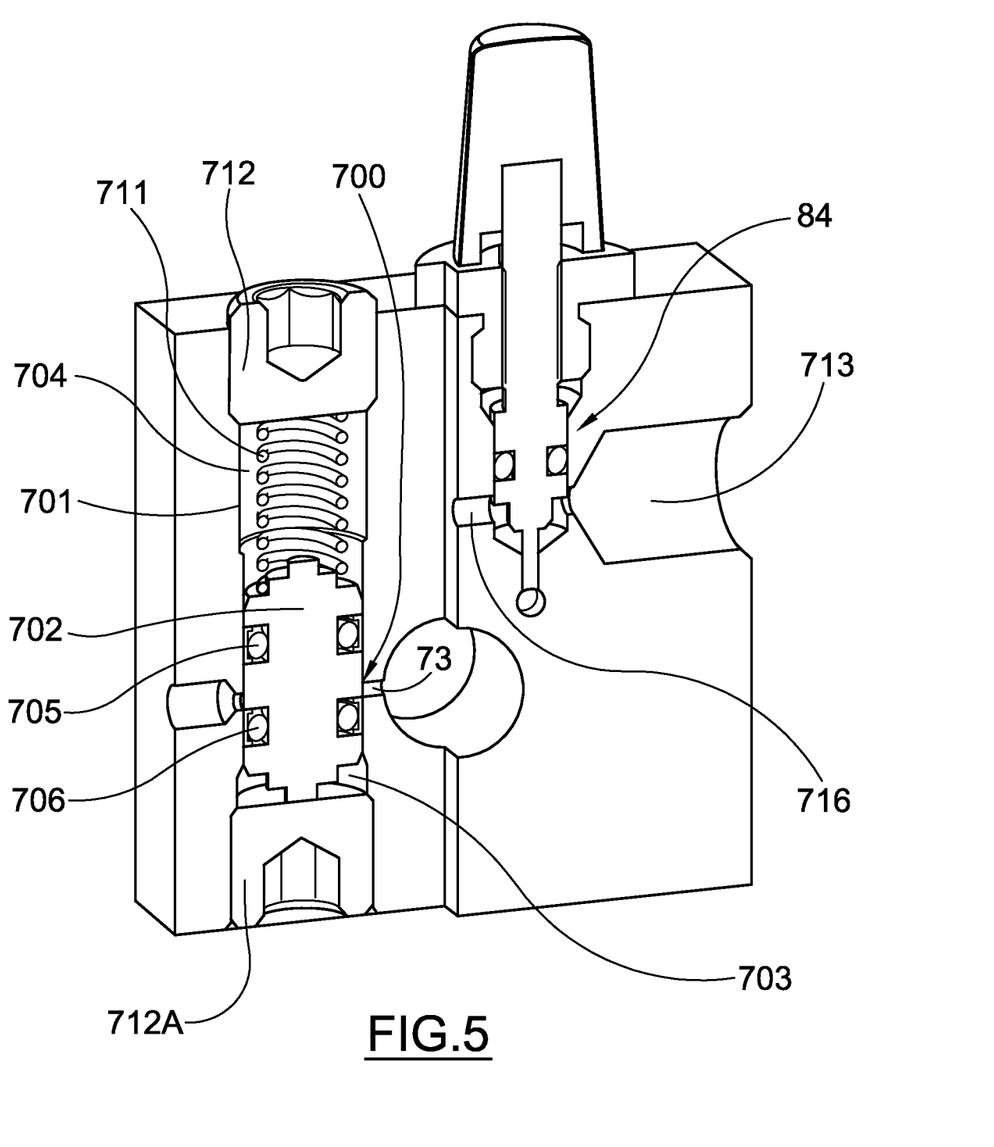
FIG. 5 is a section through the device shown in FIG. 4.

A further preferred embodiment of the present invention, specifically of the module M, is shown in FIGS. 4 and 5.

The compensator device 20 comprises a seat 701 in which a slider 702 is is movable against a spring 711 to define a first chamber 703 and a second chamber 704. The slider presents a pair of gaskets 705, 706 which further define an annular chamber 707 centrally surrounding the slider.

The annular chamber 707 presents an inlet port 700 which is connected to the conduit 73 leaving the pressure side of the pump 6 and an outlet port 708 which opens into a conduit 709A, 709B, 709C feeding the needle flow regulator. The outlet is also connected (via a channel 709D) to a seat 801 in which a pressure gauge can be housed for measuring the inlet pressure to the needle valve.

As in the preceding embodiment, a groove (not visible) is present on the piston surface which enables the inlet port 700 to be throttled.

The slider is loaded by a spring 711 present in the second chamber 703, this spring resting on a preload screw 712. The chamber 704 is closed by a further screw 712A. The first chamber communicates with the conduit 73 leaving the pressure side of the pump 6.

The second chamber 704 is in fluid passage communication with an outlet conduit 716 from the needle regulator 84. Another outlet conduit 713 from the needle regulator feeds oil to the air/oil mixer 88.

Figure 6:
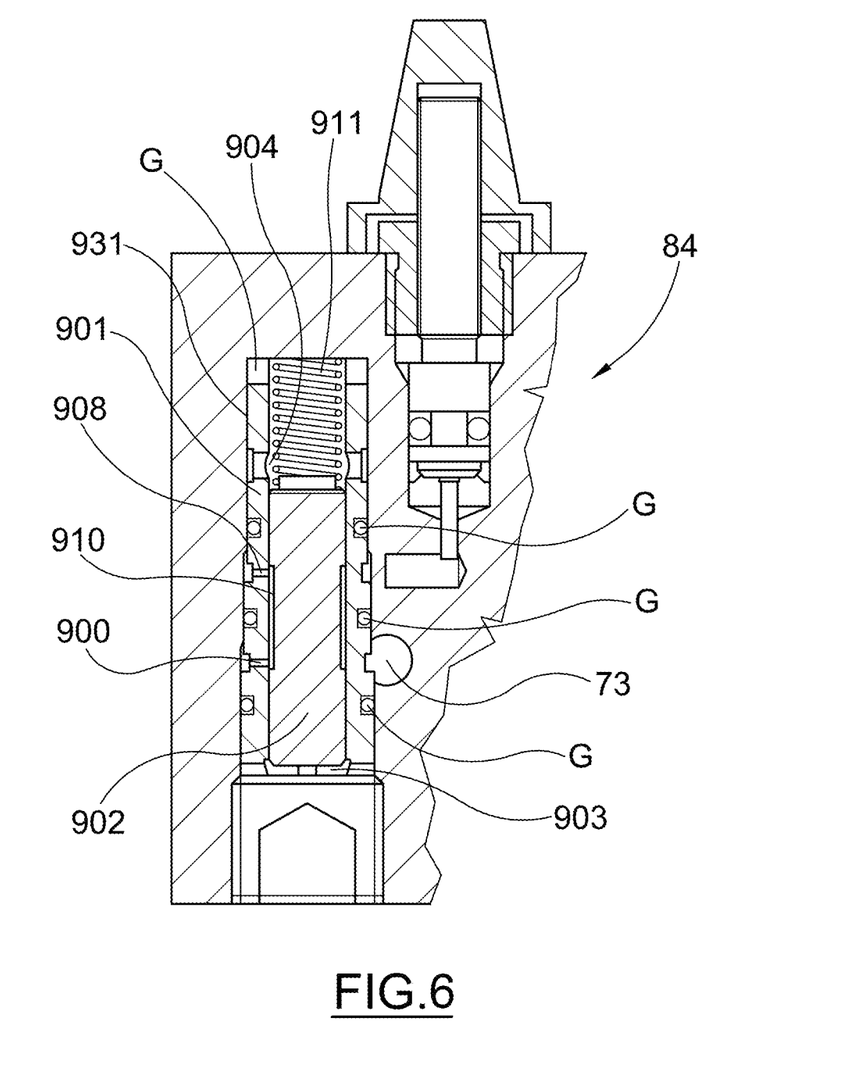
FIG. 6 is a section through a portion of the modular element in an alternative embodiment.

The aforedescribed embodiment operates very well when the module casing is of steel. However it has been found that if the module is made of another material, such as aluminium or other suitable material, the compensator device is preferably formed as shown in FIG. 6.

Specifically, the slider 902 in this case is slidable within a jacket 901 inserted into a suitable seat 931 provided in the module.

The compensator device 20 in this embodiment hence comprises the jacket 901 in which the slider 902 is movable against a spring 911, to define a first chamber 903 and a second chamber 904.

Both the slider and the jacket are made of steel. The slider has a ground surface which provides a metal/metal seal on the lapped inner surface of the jacket.

The slider also has a depressed part 910 which substantially defines the annular chamber 907 centrally surrounding the slider.

The annular chamber 907 has an inlet port 900 communicating with the conduit 73 leaving the pressure side of the pump 6 and an outlet port 908 which opens into a conduit (not shown) feeding the needle flow regulator 84.

In this embodiment, throttling of the inlet port 900 is achieved by direct cooperation between the piston wall (that which seals against the jacket) and that port in the region in which the annular chamber begins. The slider 902 is loaded by a spring 911 present in the second chamber 903.

The second chamber 904 communicates with an outlet conduit from the needle regulator 84, while the first chamber communicates with the conduit 73 leaving the pressure side of the pump 6.

The jacket is inserted into the seat 931 and the various jacket sections are isolated by suitable gaskets. Passages are obviously also formed in the seat to enable the aforedescribed fluid communications.

The operation of this embodiment is identical to that already described previously.

The invention claimed is:

1. A minimal lubrication device comprising
a lubricant fluid storage reservoir,
at least one modular element,
means for raising the pressure of said lubricant fluid fed through a lubricant fluid delivery conduit to said at least one modular element,
the modular element comprising a lubricant fluid conduit,
the lubricant fluid conduit having a lubricant fluid flow regulator valve, a first portion of the lubricant fluid conduit, and a second portion of the lubricant fluid conduit,
wherein the lubricant fluid flow regulator valve has a lubricant fluid flow regulator valve inlet and a lubricant fluid flow regulator valve outlet; and
a compressed air conduit,
the lubricant conduit and the compressed air conduit being in communication with an air/lubricant mixer element,
wherein said modular element comprises a pressure compensator device upstream of the lubricant fluid flow regulator valve, wherein said compensator device comprises a lubricant pressure regulator element upstream of the lubricant fluid flow regulator valve and directly controlled by the pressure present downstream of said lubricant fluid flow regulator valve,
said compensator device for maintaining substantially constant the lubricant pressure difference measured across the lubricant fluid flow regulator valve by adjusting pressure of lubricant fluid from the compensator device fed to the lubricant fluid flow regulator to compensate for changes in pressure of lubricant fluid discharged from the lubricant fluid flow regulator valve;
wherein said compensator device comprises said lubricant pressure regulator element which comprises a slider housed in a seat and defining a first chamber, a second chamber, and a third chamber, wherein the slider comprises a portion within the third chamber arranged to vary the passage cross-section of at least one from among said inlet cross-section and said outlet cross-section by moving the slider,
wherein the slider has opposed first and second end walls and sidewalls between the first and second opposed end walls, the first end wall for subjecting to pressure of the first chamber and the second end wall for subjecting to pressure of the second chamber and the slider is movable without rotation;
the first chamber defined at least in part by the seat and the first opposed end wall,
the second chamber defined at least in part by the seat and the second opposed end wall,
the third chamber being between said first chamber and said second chamber,
the third chamber communicating via an inlet port with the lubricant fluid delivery conduit,
wherein the first portion of the lubricant fluid conduit connects an outlet port of the third chamber and the lubricant fluid flow regulator valve inlet, and the second portion of the lubricant fluid conduit connects the lubricant fluid regulator valve outlet and the air/lubricant mixer element,
the first chamber in communication via a third conduit with the first portion of the lubricant fluid conduit which is in communication with the lubricant fluid flow regulator valve inlet;
the second chamber in communication via a fourth conduit with the second portion of the lubricant fluid conduit which is in communication with the lubricant fluid flow regulator valve outlet;
the compensator device comprising means for increasing the force exerted on the end wall of the slider in the second chamber in addition to the force exerted on the slider by the lubricant present in the second chamber.

2. A device as claimed in claim 1, wherein said means for increasing the force exerted on the slider by the lubricant comprise, housed in the second chamber, a spring against which said slider moves.

3. A device as claimed in claim 2, wherein said means for increasing the force exerted on the slider by the lubricant comprise a slider surface exposed to the pressure present in the second chamber which is greater than that slider surface exposed to the pressure in the first chamber.

4. A device as claimed in claim 1, wherein said seat comprises a bottom closed by a screw for regulating the load on said spring.

5. A device as claimed in claim 1, wherein said flow regulator valve is a needle flow regulator.

6. A device as claimed in claim 1, wherein said means for raising the lubricant pressure comprise a pump for providing said modular element with oil at a pressure between 10 and 100 bar.

7. A device as claimed in claim 1, wherein said modular element comprises a solenoid valve controlling a device for intercepting the oil flow and/or air flow directed towards said mixer element.

8. A device as claimed in claim 1, wherein said modular element comprises a regulator cock for the air flow fed into said mixer element and/or the mixer element is integrated into the modular element.

9. A device as claimed in claim 1, wherein said modular element comprises an anti-drip element arranged to store the oil if compressed air is absent.

10. A device as claimed in claim 1, wherein several mutually connected modules define a main pressurized oil conduit and/or a main compressed air conduit which are connected respectively to the pump delivery and to a compressed air source, each module drawing compressed air and lubricant from said conduits.

11. A device as claimed in claim 1, wherein said modular element comprises a vortex tube disposed on the compressed air conduit to lower the temperature of the air flow with which to mix said lubricant.

12. A device as claimed in claim 1, wherein said slider slides within a jacket inserted into a seat provided in said modular element.

13. A device as claimed in claim 1, wherein the slider is movable directly in response to pressures exerted by the lubrication fluid in the first and second chambers; the slider comprising a portion arranged to vary the passage cross-section of at least one from among said inlet cross-section and said outlet cross-section by moving the slider.

14. A minimal lubrication device comprising
a lubricant fluid storage reservoir,
at least one modular element,
pump means for raising the pressure of said lubricant fluid fed through a lubricant fluid delivery conduit to said at least one modular element,
the modular element comprising a lubricant fluid conduit, the lubricant fluid conduit having a lubricant fluid flow regulator valve, and
said lubricant fluid flow regulator valve having a lubricant fluid flow regulator inlet and a lubricant fluid flow regulator outlet;
wherein a first portion of the lubricant fluid conduit connects the compensator device and the lubricant fluid flow regulator valve inlet, and a second portion of the lubricant fluid conduit connects the lubricant fluid regulator valve outlet and the air/lubricant mixer element,
a compressed air conduit,
the lubricant conduit and the compressed air conduit being in communication with an air/lubricant mixer element,
wherein said modular element comprises a pressure compensator device upstream of the lubricant fluid flow regulator valve, wherein said compensator device comprises a lubricant pressure regulator element upstream of the lubricant fluid flow regulator valve and directly controlled by the pressure present downstream of said lubricant fluid flow regulator valve,
said compensator device for maintaining substantially constant the lubricant pressure difference measured across the lubricant fluid flow regulator valve by adjusting pressure of lubricant fluid from the compensator device fed to the lubricant fluid flow regulator to compensate for changes in pressure of lubricant fluid discharged from the lubricant fluid flow regulator valve;
wherein said compensator device comprises:
a slider housed in a seat defining a first chamber with a first conduit communicating with said lubricant fluid flow regulator valve inlet conduit for maintaining said first chamber at a pressure of the lubricant fluid flow regulator inlet,
a second chamber with a second conduit communicating with said lubricant fluid flow regulator valve outlet conduit for maintaining said second chamber at a pressure of the lubricant fluid flow regulator outlet, and
a substantially annular third chamber between the first chamber and the second chamber, said third chamber communicating with a pump delivery conduit via an inlet port and with the lubricant fluid flow regulator valve inlet via an outlet port,
the slider comprising within the third chamber a portion arranged to vary the passage cross-section of at least one from among said inlet cross-section and said outlet cross-section by moving the slider,
the compensator device comprising means for increasing the force exerted on the slider in addition to the force exerted by the lubricant present in the second chamber,
wherein a third conduit connects the first portion of the lubricant fluid conduit to the first chamber and a fourth conduit connects the second portion of the lubricant fluid conduit to the second chamber.

15. A device as claimed in claim 14, wherein the slider is movable directly in response to pressures exerted by the lubrication fluid in the first and second chambers; the slider comprising a portion arranged to vary the passage cross-section of at least one from among said inlet cross-section and said outlet cross-section by moving the slider.

16. A device as claimed in claim 14, wherein the slider has opposed first and second ends, the first end for subjecting to pressure of the first chamber and the second end for subjecting to pressure of the second chamber and the slider is movable without rotation.

17. A device as claimed in claim 14, wherein the air/lubricant mixer element comprises a spray nozzle to spray the air/lubricant mixture.

\* \* \* \* \*